United States Patent

[11] 3,632,141

[72] Inventor Gunnar Larsson
 Halsingborg, Sweden
[21] Appl. No. 859,265
[22] Filed Sept. 19, 1969
[45] Patented Jan. 4, 1972
[73] Assignee AGA-Platforadling Aktiebolag
 Halsingborg, Sweden
[32] Priority Sept. 19, 1968
[33] Sweden
[31] 12603/68

[54] ARRANGEMENT FOR JOINING A SLEEVE WITH A TUBE
29 Claims, 19 Drawing Figs.

[52] U.S. Cl. .............................................. 285/24,
 285/328, 285/351, 285/369, 285/382.7, 285/383
[51] Int. Cl. .............................................. F16l 35/00
[50] Field of Search ............................ 285/369,
 343, 382, 24, 382.1, 27, 382.2, 382.7, 382.4, 248,
 256, 328, 382.5, 351, 383; 29/508, 517, 521

[56] References Cited
 UNITED STATES PATENTS
2,292,421 8/1942 Wolf .............................. 29/508

| 3,149,860 | 9/1964 | Hallesy ........................ | 285/382 X |
| 3,149,861 | 9/1964 | Larsson ........................ | 285/382.2 X |
| 3,244,441 | 4/1966 | Coudle ........................ | 285/382 X |
| 3,438,655 | 4/1969 | Campbell ...................... | 285/382.4 X |

FOREIGN PATENTS

| 858,172 | 12/1952 | Germany ...................... | 285/340 |
| 19,043 | 1889 | Great Britain ................. | 285/382 |
| 511,527 | 8/1939 | Great Britain ................. | 285/382 |
| 796,065 | 6/1958 | Great Britain ................. | 285/382.2 |

Primary Examiner—Dave W. Arola
Attorney—Larson, Taylor & Hinds

ABSTRACT: A tubular joint having a sleeve formed tightly onto a tube by compression of the latter onto the former. The joint includes, in order from the inside of the tube outwardly, a support section for guiding the inner end of the tube, a sealing ring and an outer support section located adjacent the sealing ring. Either one of or both of the support sections may be integral with the sleeve or formed as a ring located between the tube and the sleeve. After assembly of all elements, the sleeve is compressed onto the tube to form the permanent joint.

INVENTOR
GUNNAR LARSSON

INVENTOR
GUNNAR LARSSON

BY Larson and Taylor
ATTORNEYS

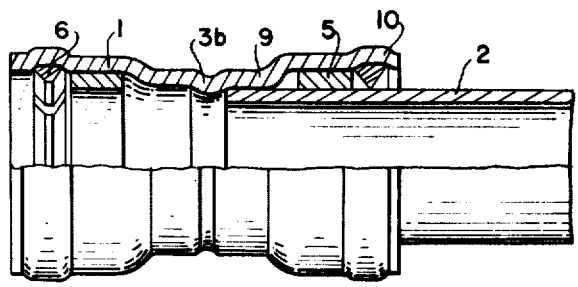
FIG. 9
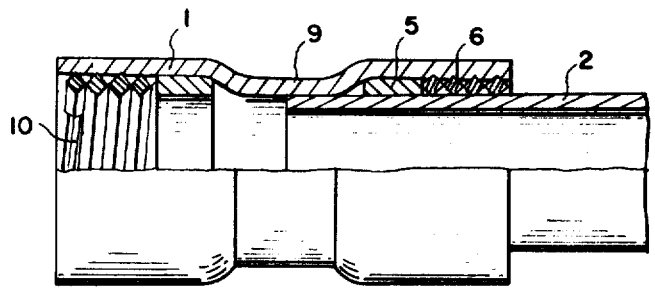
FIG. 10
FIG. 11 A.   FIG. 11 B.   FIG. 12 A.   FIG. 12 B.
 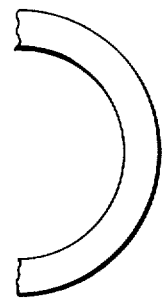 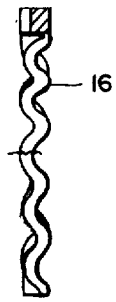 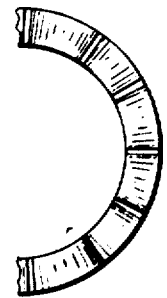
FIG. 13A   FIG. 13B   FIG. 14A   FIG. 14B
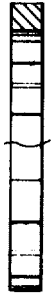  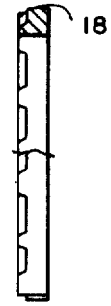 
INVENTOR
GUNNAR LARSSON

ARRANGEMENT FOR JOINING A SLEEVE WITH A TUBE

BACKGROUND OF THE INVENTION

This invention relates to the formation of a tubular joint wherein a sleeve is formed onto a tube and attached thereto.

In known joints of the present type, the sleeve located about the tube has included an interior groove formed therein for accommodating a sealing ring, the sleeve with the ring therein being threaded over the end of the tube after which the sleeve was compressed onto the tube. In this arrangement the outer end of the sleeve was pressed into the wall of the tube by compression to form the permanent joint between the elements. It is possible by this previous method to obtain a relatively satisfactory joint between the tube and the sleeve when using tubes with smooth ends and especially when using thin-wall tubes.

However, when the tubes to be joined together by means of the sleeve are of a larger dimension, the above-known arrangement has proved to be unsatisfactory. Specifically, it has been difficult to obtain sufficient penetration of the sleeve into the wall of the tube. This disadvantage occurred because with larger diameter tubes it was necessary to use a proportionally thicker sleeve thereby requiring a higher compressive force to form the sleeve tightly onto the tube. Thus, when joining tubes of relatively large diameter, it has been necessary to use larger heavier sleeves which are more costly to produce and also more difficult to compress onto the tubes.

SUMMARY OF THE INVENTION

Thus, it is a purpose of this invention to provide a new and improved method and arrangement for joining the end of a tube to a sleeve, which method and arrangement overcome disadvantages of the prior art.

This purpose is achieved in accordance with the present invention by providing a sleeve, a tube to be joined to the sleeve, and providing inner and outer support means and a sealing ring position between said support means. The inner support means is located adjacent the inner end of the tube and this support means may comprise either a separate clutch ring located between the tube and the sleeve or this inner support means may comprise a portion of the sleeve itself bent inwardly to engage the outside of the inner end of the tube. The purpose of this inner support means is to guide the tube into the sleeve and subsequently to assist in the formation of the permanent joint. The outer support means may comprise either the outer end of the sleeve adapted to be bent inwardly to penetrate the tube or it may comprise a separate clutch ring located between the sleeve and the tube in the vicinity of the outer end of the sleeve. A resilient sealing ring is located between the sleeve and the tube, between the two support means and preferably immediately adjacent the outer support means. With this arrangement, after the joint is completed, further deformation of the sealing means will be partially limited by its engagement with the outer support means.

The tubular joint also comprises a stop means located within the sleeve and having an inner diameter smaller than the outer diameter of the tube for limiting the axial movement of the tube into the sleeve. This stop means may comprise a separate ring or an inwardly projecting portion formed integrally with the sleeve.

Generally, the purpose of the joint will be to join together two separate tubes, each entering the sleeve from an opposite end thereof, the inward axial movement of the tubes being limited by the stop means.

After the sleeve, the support means, the sealing ring and tube are assembled together, the sleeve is compressed radially inwardly, causing the support means to penetrate the tube to form a permanent joint between the sleeve and the tube.

The invention may include many different modifications and variations. For example, the inner surface of the sleeve may either be smooth or formed with a circular groove for receiving one or more of the clutch rings or the sealing ring. Also, the clutch rings may have numerous different shapes, many of these shapes intended to prevent rotational movement between the tube or tubes and the sleeve.

Although the arrangement and method of the present invention are particularly advantageous for joining together thick-wall tubes, the invention can, of course, be applied with advantageous results to thin-walled tubes. Also, the material of the tube is not critical. For example, the invention can be applied to metallic tubes, plastic tubes, etc. Also, the tubular joints may be either straight, angular, branch joints of the integral type as well as disconnectable joints of various types.

Thus, it is a purpose of this invention to provide a new and improved method and arrangement for a joint including an outer sleeve formed onto a tube.

It is another object of this invention to provide a new and improved method and apparatus for the formation of a tubular joint including a sleeve surrounding the one or more tubes to be connected by means of the sleeve, and including inner and outer support means with a resilient ring located therebetween, and wherein the sleeve is compressed onto the tube to form the permanent joint.

It is another object of this invention to provide a new and improved tubular joint having improved clutch rings for causing the permanent engagement between the sleeve and the tube.

It is another object of this invention to provide a method for attaching a tube to a sleeve wherein various holding elements are inserted into the sleeve by means of differently shaped mandrels after which the tube is inserted into the sleeve and the sleeve compressed onto the tube to form the permanent joint.

Other objects and the attendant advantages of the present invention will become apparent from the detailed description to follow, together with the accompanying drawings.

BRIEF DESCRIPTION OF THE DRAWINGS

There follows a detailed description of preferred embodiments of the invention to be read together with the accompanying drawings, said drawings and said description being provided solely to illustrate preferred embodiments of the invention.

FIGS 7–9 illustrate embodiments similar to FIGS. 1, 3 and 4, respectively, but including a groove formed in the sleeve.

FIG. 10 is a side elevational view similar to FIG. 1 but including grooves like the embodiments of FIGS. 7–9 and including further modifications.

FIGS. 11A and 11B illustrate in side and end elevation, respectively, a modified clutch ring for use in the assemblies of FIGS. 1–10.

FIGS. 12A and 12B are similar to FIGS. 11A and 11B and show still another embodiment of the clutch ring.

FIGS. 13A and 13B are similar to FIGS. 11A and 11B and show still another embodiment of the clutch ring.

FIGS. 14A and 14B are similar to FIGS. 11A and 11B and show still another embodiment of the clutch ring.

DETAILED DESCRIPTION OF THE PREFERRED EMBODIMENTS

Figure 1:
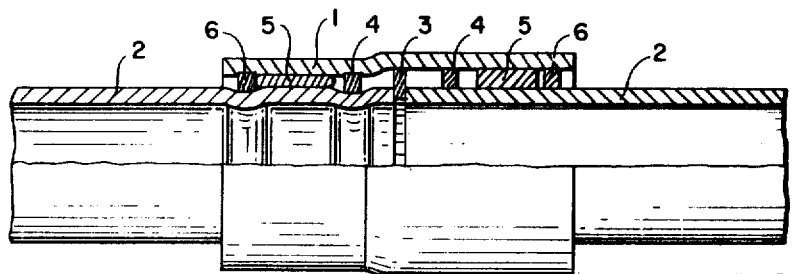
FIG. 1 is a side elevational view, partially in section, showing a joint construction in accordance with the features of the present invention.

Referring now to the drawings, like numerals represent like elements throughout the several views.

FIG. 1 illustrates a tubular joint comprising a sleeve 1 and two tubes 2 positioned therein. The right-hand side of FIG. 1 illustrates the joint at an intermediate step before completion thereof and the left-hand side of FIG. 1 illustrates the completed joint.

To form the joint a stop means is placed in the sleeve 1 to limit movement of the tubes 2 into the sleeve. In FIG. 1 this stop means comprises a stop ring 3. On each side of the stop ring 3 there is provided inner support means, in this case a hard, preferably metallic clutch ring 4. A sealing ring 5 is placed into the sleeve outside of the clutch ring 4. Finally an outer support means, in this case an outer clutch ring 6 is placed into the sleeve outside of the sealing ring 5. These rings 3, 4, 5 and 6 are inserted into the sleeve before the introduction of the tubes 2. The insertion of the rings is accomplished, preferably with the aid of mandrels of different predetermined lengths or, if the mandrels are equal length, by imparting to them axial movements of different lengths. After the rings are properly located, the tubes 2 are inserted into the sleeve 1 inside of the rings to an axial extent limited by stop ring 3. At this stage the inner support means, in this case the clutch ring 4, acts as a support and a guide means for the inner end of the tube. The sealing ring 5 is preferably located adjacent the outer support means, and this case the outer clutch ring 6, thereby providing a good sealing action after the joint has been completed, even if the joint is exposed to shock waves, since further deformation of the sealing ring 5 is limited by its engagement with outer clutch ring 6. With all of the rings and the tubes 2 properly located, the sleeve 1 is compressed radially with the aid of a pressing tool, by explosives, etc. This compression causes the clutch rings 4 and 6 to penetrate into the walls of the tubes 2 as shown on the left-hand side of FIG. 1. In some cases it is also preferable to have the clutch rings penetrate into the walls of the sleeve. This is controlled by the choice of materials for the sleeve and for the clutch rings. Sealing ring 5, which is preferably of softer material than that of the sleeve and the tubes, is flattened to extend between the clutch rings as shown on the left-hand side of FIG. 1, and against the outer clutch ring 6. Thus, in the finished joint, both halves will be compressed as shown on the left-hand side of FIG. 1.

Figure 2:
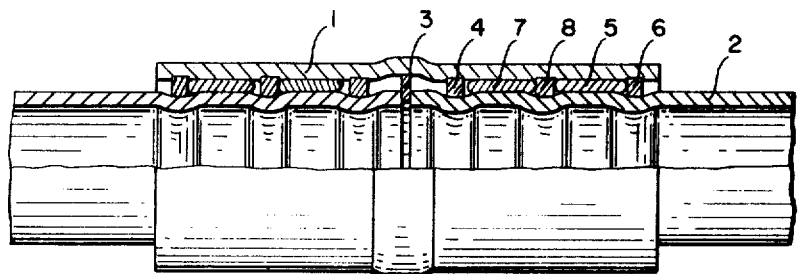
FIG. 2 is a view similar to FIG. 1 but showing a modification thereof.

FIG. 2 illustrates a tubular joint which is substantially similar to that of FIG. 1 but wherein an additional sealing ring 7 and an additional clutch 8 are provided between the previously provided elements 4 and 5 to increase the strength and the reliability of the tubular joint. Also, FIG. 2 illustrates a joint wherein both sides have already been fully compressed. In principle, it is possible to provide any number of sealing rings and intermediate clutch rings between the inner and outer support means.

FIGS. 3-6 illustrate modifications wherein the sleeve 1 is first deformed so that a portion thereof supplements or replaces one of the rings 3, 4 or 6.

Figure 3:
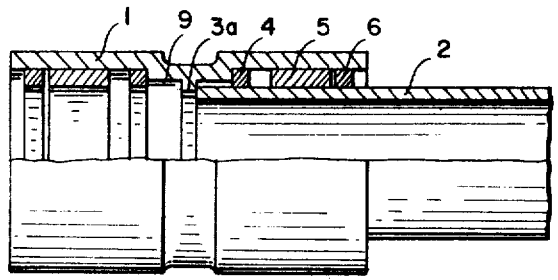
FIG. 3 is a view similar to FIG. 1 but showing a modified joint, partly assembled.

In FIG. 3, the central portion of the sleeve forms a special central support section 9 which complements the inner clutch ring 4 to support the inner end of the tube 2. This section 9 also includes an inwardly projecting portion 3a, integral therewith, to act as the stop means. The sleeve of this type can be manufactured by numerous procedures such as casting, pressing, etc.

Figure 4:
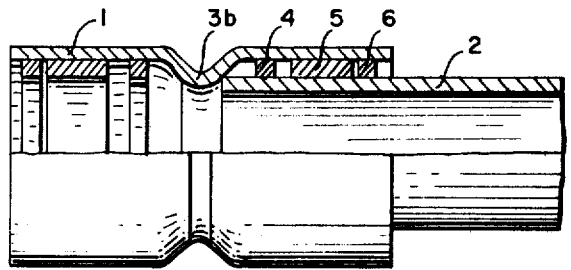
FIG. 4 is a view similar to FIG. 1 but showing another modified joint, partially assembled.
Figure 5:
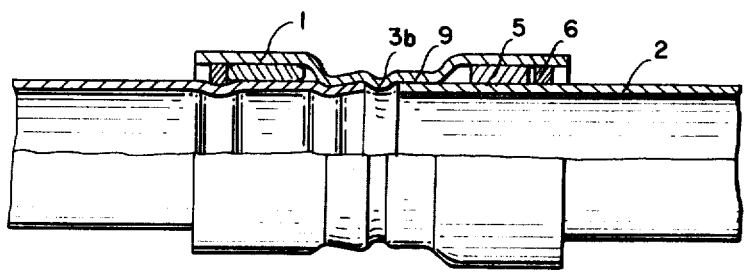
FIG. 5 is another view similar to FIG. 1 but showing the joint of FIG. 4, fully assembled.

FIG. 4 illustrates still another embodiment. In this case, as in the case of FIG. 1, the inner support means is comprised only of the clutch ring 4. However, in this case the sleeve 1 is bent inwardly as shown at 3b to act as the stop means. FIG. 5 illustrates an arrangement similar to FIG. 4 but with two tubes 2 inserted therein, with the clutch ring 4 omitted, and after the completion step has been completed.

Figure 6:
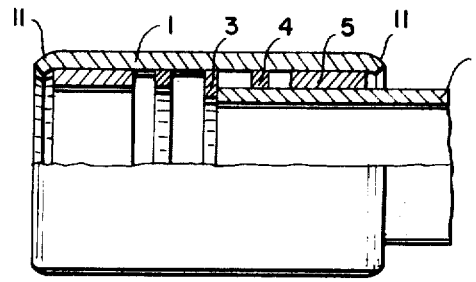
FIG. 6 is a view similar to FIG. 1 illustrating still another embodiment of the invention, the elements partially assembled.
Figure 6A:
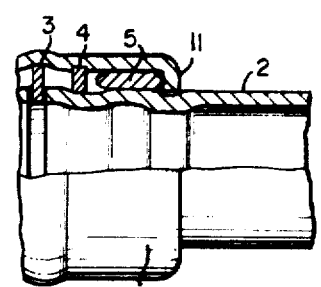
FIG. 6a shows the right-hand side of FIG. 6 after the sleeve has been compressed onto the tube.

FIG. 6 illustrates still another embodiment wherein the sleeve 1 is formed with inwardly projecting outer ends 11 which comprise the outer support means in place of the outer clutch rings 6 as shown in FIGS. 1-5.

In all of FIGS. 1-6, before the compression step, the inner surface of the sleeve 1 has been free from grooves or the like. That is, except for the sharp corners forming the elements 3a and 9 in FIG. 3, the inner surface of the sleeve 1 is smooth. In contrast thereto, FIGS. 7-10 illustrate further embodiments of the invention wherein circular grooves 10 are formed in the inner surface of the sleeve 1 for receiving the clutch rings. Of course, these grooves may be provided for any one or more of the clutch rings. In addition, it may be desirable to provide a groove for the sealing ring 5. It is particularly advantageous to provide said grooves in the sleeve when the material of the sleeve is hotter than that of the clutch rings or if the thickness of the walls of the tube 2 is small or the material thereof is soft, since in these cases the clutch rings cannot penetrate into the wall of the tube upon compression thereof.

Figure 7:
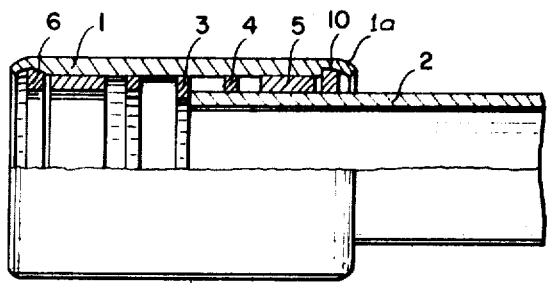

FIG. 7 illustrates a joint similar to FIG. 6 but including an outer clutch ring 6. This outer clutch ring is placed into the groove 10 which has been formed by reducing the thickness of the sleeve 1 at portions 1a and by turning and bending these portions 1a after the insertion of the outer clutch rings 6.

Figure 8:
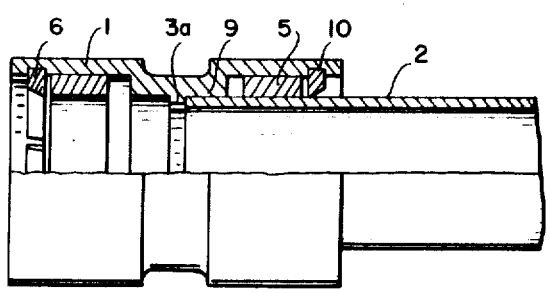

FIG. 8 illustrates a joint similar to that shown in FIG. 3 with the exception that the clutch ring 4 has been omitted. In this case the outer clutch ring 6 is placed into a cutout groove 10. FIG. 9 shows an embodiment similar to that of FIG. 5 wherein the clutch ring 6 is located in a groove 10.

FIG. 10 illustrates a further embodiment of the invention. In this case the clutch rings comprise rings 14 positioned in planes oblique to the axis of the tube. These rings may comprise either one continuous helix or a plurality of similar rings placed side by side. These rings are so constructed that one of the corners engages a corresponding groove in the sleeve 1 while an opposite corner engages the surface of the tube 2.

In FIGS. 7-10 the grooves are illustrated only for the outer clutch ring or rings. However, it should be apparent that these grooves may also be provided for the inner clutch rings or for the sealing rings. FIGS. 7-10 also illustrate various possible shapes for the clutch rings. For example, FIG. 8 illustrates a clutch ring having a trapezoidal cross section, FIG. 9 illustrates a clutch ring having a generally triangular cross section and FIG. 10 illustrates clutch rings having a square cross section with two corners pointing toward the sleeve and the tube, respectively. Also, as is illustrated in FIGS. 8 and 9, the clutch rings may be constructed 14A the 14B of split rings urged resiliently outwardly such that when located at the appropriate axial position, the resilience of the material will hold the clutch ring in place.

FIGS. 11-14 illustrate further embodiments of the clutch rings. FIGS. 11A and 11B illustrate a clutch ring having a generally rectangular cross section, a smooth interior surface and a knurled outer surface. This nonsmooth outer surface facilitates penetration of the clutch ring into the sleeve and it also prevents possible rotational movement between the sleeve and the tube. Still better prevention of rotational movement between the sleeve and the tubes is provided by the clutch rings shown in FIGS. 12-14. FIGS. 12A and 12B illustrate an arrangement wherein the clutch ring includes axially extending undulations 16. The embodiment of 13A and 13B includes inwardly and outwardly directed sections 17. FIGS. 14A and 14B illustrate a clutch ring having circular projections 18. Of course the various features shown in FIGS. 11-14 can be suitably combined in any given embodiment. For example, a clutch ring as shown in one of FIGS. 11-14 might serve as an inner clutch ring 4, and in the same embodiment the outer clutch ring 6 may comprise a triangular-shaped ring as shown in FIG. 9, and this could be given additional undulations as shown in FIGS. 12A and 12B. Obviously, a virtually unlimited number of combinations are possible.

Although the invention has been described in detail with respect to preferred embodiments thereof, it will be apparent that the invention is capable of numerous modifications and variations apparent to those skilled to the art without departing from the spirit and scope of the invention.

I claim:

1. An arrangement for sealingly joining a sleeve to a tube comprising:
    a sleeve sufficiently thin to be compressed against a tube,
    a tube having an inner end located in the sleeve,
    inner support means for supporting the inner end of the tube relative to the sleeve and for forming a permanent joint between the sleeve and the tube upon radial compression of the sleeve toward the tube,
    a sealing ring located radially between the sleeve and the tube and located axially between the support means and the outer end of the sleeve,
    and an outer support means, located axially between the sealing ring and the outer end of the tube, for supporting the tube and for forming a permanent joint between the sleeve and the tube upon radial compression of the sleeve toward the tube, at least one of said support means comprising a hard separate clutch ring located between the sleeve and the tube for guiding the tube into the sleeve and for assisting in the formation of the final joint after the said radial compression.

2. An arrangement according to claim 1 wherein said sealing ring and said outer support means are sufficiently close to each other axially that upon said radial compression of the sleeve deformation of the sealing ring is at least partially limited by said outer support means.

3. An arrangement according to claim 1, wherein the inner support means is a clutch ring and the outer support means is constituted by the outer end of the sleeve, bent in to penetrate into the tube upon said radial compression of the tube.

4. An arrangement according to claim 1, wherein the outer support means comprises a hard clutch ring located radially between the sleeve and the tube and located axially between the sealing ring and the outer end of the sleeve, whereby upon said radial compression of the sleeve, the clutch ring penetrates the tube to form said outer joint.

5. An arrangement according to claim 4, including a plurality of said clutch rings located between the said outer end of the sleeve and the inner support means, and including a sealing ring located axially adjacent each clutch ring on the side thereof towards the said inner end of the tube.

6. An arrangement according to claim 1, wherein said clutch ring has a rectangular cross section.

7. An arrangement according to claim 1, wherein said clutch ring has a trapezoidal cross section.

8. An arrangement according to claim 1, wherein said clutch ring is oblique relative to the axis of the tube.

9. An arrangement according to claim 8, wherein said clutch ring comprises a helix.

10. An arrangement according to claim 1 wherein said clutch ring includes holding means for preventing rotational movement between the sleeve and the tube.

11. An arrangement according to claim 10, said holding means comprising a rough surface on the exterior of the clutch ring.

12. An arrangement according to claim 10, said holding means constituted by axial undulations on the clutch ring.

13. An arrangement according to claim 10, said holding means having radially extending projections thereon.

14. An arrangement according to claim 1, wherein the sleeve has a smooth inner surface beyond the inner support means in the axial direction, the diameter of said surface being at least as large as the outer diameter of the clutch ring provided therein.

15. An arrangement according to claim 1, including a stop ring located in the sleeve and having an inner diameter smaller than the outer diameter of the tube for limiting inward movement of the tube in the sleeve, and the said sleeve having a smooth inner surface with a diameter at least as large as the exterior diameter of the stop ring and the clutch ring.

16. An arrangement according to claim 1, including grooves formed in the interior of the sleeve, said clutch ring arranged to fit into said groove.

17. An arrangement according to claim 1, including a stop means for limiting the inward movement of the tube receiver to the sleeve.

18. An arrangement according to claim 17, said stop means comprising a stop ring in the sleeve and having an inner diameter smaller than the outer diameter of the tube.

19. An arrangement according to claim 17, said stop means comprising a stop portion integral with the sleeve and extending radially inwardly therefrom to prevent axial movement of the tube into the sleeve past the stop portions.

20. An arrangement according to claim 1, wherein said inner support means comprises said clutch ring.

21. An arrangement according to claim 1, said inner support means comprising a portion integral with the sleeve and positioned adjacent the outside of the inner end of the tube to support the same.

22. An arrangement according to claim 21 wherein said outer support means comprises the said clutch ring and is located axially between the sealing ring and the outer end of the sleeve.

23. An arrangement according to claim 21, said inner support further hard clutch ring positioned axially between said inner support means and said sealing ring, said second clutch ring also arranged to guide and support the inner end of the tube.

24. An arrangement according to claim 1, for joining a pair of tubes, the inner and outer support means being arranged such that the portion of the sleeve over one tube is the mirror image of the portion of the sleeve over the other tube.

25. An arrangement according to claim 24, holding a stop means comprising a stop portion integral with the sleeve and extending radially inwardly therefrom between the two said tubes to prevent axial movement of the two said tubes towards each other in the sleeve.

26. An arrangement according to claim 25, wherein said inner support means comprises a portion integral with the sleeve and formed against the outside of the inner end of the said tubes to support the two said tubes.

27. An arrangement according to claim 24 wherein said inner support means comprises a portion integral with the sleeve and positioned adjacent the outside of the inner end of the tubes to support the two said tubes.

28. An arrangement for sealing and joining a sleeve to a tube according to claim 1, wherein each of the inner and outer support means comprises clutch rings, positioned one on each side of the sealing ring, whereby both are positioned to guide the tube onto the sleeve and then to assist in forming the permanent joint when the sleeve is compressed radially against the tube.

29. An arrangement according to claim 28, wherein said sealing ring and said outer support means are sufficiently close to each other axially such that upon said radial compression of the sleeve, deformation of the sealing ring is at least partially limited by said outer support means.

* * * * *